UNITED STATES PATENT OFFICE.

CHARLES N. MERIWETHER, OF TRENTON, KENTUCKY.

PROCESS OF MAKING PHOSPHATE FERTILIZER.

1,058,249. Specification of Letters Patent. Patented Apr. 8, 1913.

No Drawing. Application filed April 18, 1912. Serial No. 691,771.

*To all whom it may concern:*

Be it known that I, CHARLES N. MERIWETHER, a citizen of the United States, residing at Trenton, in the county of Todd and State of Kentucky, have invented certain new and useful Improvements in Processes of Making Phosphate Fertilizer; and I do declare the following to be a full, clear, and exact description of the invention, such as will enable others skilled in the art to which it appertains to make and use the same.

This invention relates to that class of fertilizers made from mineral phosphate rock or bone black to render the phosphorus contained therein readily available for plants.

The object of the invention is to provide a new method of breaking up the neutral salts in which the phosphorus is found by the use of other salts or bases mixed with the salts containing the phosphorus. The salts or bases employed have been used heretofore for the same purpose but I have discovered a new method of using them whereby an improved result is produced and economy in manufacture effected. This improved method of liberating phosphorus from phosphate rock consists in mixing phosphate rock with lime rock and grinding them together, then putting the ground resulting product into a furnace and heating it to a temperature of about 1000° C. This ground material is then run out and combined with a compound of sodium or other salts, which will be hereinafter described, and reground. The reground material is then placed in the furnace and reheated to a temperature of about 800° C. When it is desired to also combine a compound of potassium with the mixture, the material is run out, reground with the compound of potassium, and then again run out and ground, in which condition it is ready for use as a fertilizer.

The gist of this invention resides in adding the salts or bases which are to be mixed with the mineral phosphates to break up neutral salts, at different times, as I have found that one material added at different times has a much better effect than if added all at once, for example, when one-half of the lime to be employed is added to the phosphate rock and the compound calcined, and then pulverized again with the other half of the lime to be used, and then recalcined, a much better effect is produced than if all the lime were added at one time.

When potash or any compound of potassium is used, it may be added with the soda or any compound of sodium, or a large quantity thereof may be added as a substitute for the soda or any sodium compound.

I have found that when using rock containing sixty-five per cent. of bone phosphate lime, a desirable proportion consists of one hundred pounds of rock, seventy-five pounds of limestone, twenty pounds of sulfate of soda and ten pounds of sulfate of potash. I have also found that the addition of about five per cent. iron oxid, if the rock has not that element in it naturally, facilitates the transformation of the phosphorus material for use as a fertilizer. Also, it has been found that the larger the proportion of lime used the larger proportion of phosphorus is changed into available form, but for general purposes the amount above stated is found desirable. When the fertilizer is to be used on soil which requires lime, an excess of lime may be used in the compound; on the other hand, when a high grade of fertilizer is desired the lime should be diminished and the soda increased. The principle of the invention resides as above stated, in the addition at different times of the material to be added to the phosphate, producing a beneficial result. In all of these operations, the amount of the different converting agents to be added to the phosphate rock, and also the heat necessary to produce the change in the availability of the phosphorus or plant food varies greatly, according to the other constituents of the rock, fluorin, silica, alumina, etc., often constituting from ten to fifty per cent. of the weight of the rock; neither can it be stated before trial whether it is best to fuse the rock from a given mine or to semi-fuse or calcine it. While fusion does not injure the product, it is not generally necessary to fuse the rock, and thus a great saving in both the fuel used and in the wear of the furnace is effected.

Phosphatic limestone sometimes contains about the proper proportion of carbonate of lime and phosphate of lime, and this material is then calcined sufficiently to drive off the carbon dioxid, and this step constitutes the first heating. The material is then pulverized and reheated without the addition of any lime but with the desired addition of potash or soda ash.

Some soils and plants require magnesia in the fertilizer, and for this purpose dolomite may be added either at the first or second heating, and when used less time will be required.

The proportions of the material stated above must be changed according to the nature of the phosphate rock being treated and the quick or slow acting product which is wished to be obtained. If the rock contains natural carbonate of lime, the amount of limestone added must be reduced proportionately.

In producing a fertilizer the compound of sodium and potassium may be added at the same time, and other compounds of sodium and potassium than those specified may be employed, also the order in which the various ingredients are added may be changed and the materials may be added at different times without removing the mass from the furnace and regrinding, without departing from the principle of this invention, which is that the cumulative effect of the materials added to effect the transformation specified is greater when said materials are added at different times than when the same quantities of these materials are added simultaneously.

I claim as my invention:

1. A process of manufacturing phosphate fertilizer from mineral phosphates which consists in adding an alkali to the mineral phosphate at different times and calcining said material between such additions.

2. The process of manufacturing phosphate fertilizer from mineral phosphates which consists in adding an alkali to the mineral phosphates, then calcining the resulting product, then adding more of the alkaline substance, then recalcining the resulting product, and finally pulverizing it.

3. The process of manufacturing phosphate fertilizer from mineral phosphates which consists in calcining the phosphate, then adding an alkali, and then regrinding and recalcining the resulting product.

In testimony whereof I have hereunto set my hand in presence of two subscribing witnesses.

CHARLES N. MERIWETHER.

Witnesses:
R. A. GARDNER,
MICHL. JOSEZH.